United States Patent [19]

Silva

[11] Patent Number: 4,973,664
[45] Date of Patent: Nov. 27, 1990

[54] METHOD FOR PREPARING POLYCARBONATES OF CONTROLLED MOLECULAR WEIGHT FROM BISCHLOROFORMATES

[75] Inventor: James M. Silva, Clifton Park, N.Y.

[73] Assignee: General Electric Company, Schenectady, N.Y.

[21] Appl. No.: 382,466

[22] Filed: Jul. 20, 1989

[51] Int. Cl.$^5$ ............................................. C08G 64/20
[52] U.S. Cl. ..................................... 528/371; 528/372
[58] Field of Search ......................................... 528/371

[56] References Cited

U.S. PATENT DOCUMENTS 4,737,573  4/1988  Silva et al. ........................... 528/371
4,743,676  5/1988  Silva et al. ........................... 528/371

Primary Examiner—Harold D. Anderson
Attorney, Agent, or Firm—William H. Pittman; James C. Davis, Jr.

[57] ABSTRACT

Aromatic polycarbonates having a predetermined relatively low weight average molecular weight, as well as a low molecular weight distribution, are prepared by partially capping an aromatic bischloroformate composition, preferably a bisphenol A bischloroformate composition, with a monohydroxyaromatic compound and subsequently converting the partially capped composition to a polycarbonate, using a base which provides a buffered pH in the range of about 12–13. The preferred base is calcium hydroxide, which is soluble in water in precisely the amount required to provide the desired pH.

11 Claims, No Drawings

METHOD FOR PREPARING POLYCARBONATES OF CONTROLLED MOLECULAR WEIGHT FROM BISCHLOROFORMATES

This invention relates to the preparation of polycarbonates, and more particularly to the preparation of low molecular weight polycarbonates having a relatively low molecular weight distribution from aromatic bischloroformate compositions.

Methods for preparing aromatic polycarbonates from bischloroformate oligomer compositions are disclosed in various patents, including U.S. Pat. No. 4,737,573. These methods are advantageous in that they permit the preparation of polymers which do not contain trace amounts of diaryl carbonates, which are formed as by-products by the reaction of endcapping agents such as phenol with phosgene in the conventional phosgene method for polycarbonate preparation. Diaryl carbonates, when present, may cause difficulties in molding operations.

Various polycarbonate applications require that the polymers have relatively low molecular weight. For example, the molding of optical discs requires that the polycarbonate have a high melt flow value to achieve rapid molding cycle times. For this purpose and similar ones, a weight average molecular weight in the range of about 19,000–23,000 is desirable. The predictable attainment of molecular weights in this range is possible by suitable adjustment of the proportion of endcapping agent employed.

An undesirable side effect of the preparation of polycarbonates of relatively low molecular weight, however, is the presence therein of very low molecular weight oligomers, indicated by a high molecular weight distribution (i.e., the ratio of weight average to number average molecular weight), frequently above 2.5. The presence of low molecular weight oligomers in significant amount can cause brittleness of the polycarbonate. Moreover, the presence of sizeable proportions of low oligomers raises an increasing possibility of decrease in average molecular weight as a result of chain scission by transesterification during such operations as extrusion, promoted by the presence of salts such as sodium chloride, another by-product of the polycarbonate-forming reaction.

The present invention is based on the discovery that polycarbonates having both a relatively low molecular weight and a relatively low molecular weight distribution may be prepared from bischloroformate oligomer compositions in a polymerization operation with two features. The first of these features is an initial step of partly capping the bischloroformate composition by reaction with a monohydroxyaromatic compound. The second feature is the employment of a base which buffers the aqueous phase of the reaction mixture at a specific and relatively high pH value, preferably an alkaline earth metal base.

Accordingly, the invention is a method for converting an aromatic bischloroformate composition to aromatic polycarbonate having a predetermined weight average molecular weight which comprises the steps of:
(A) partially capping said bischloroformate composition by reaction with a monohydroxyaromatic compound or salt thereof in an amount to provide the desired molecular weight, and
(B) contacting a solution of the partially capped bischloroformate composition in an inert, substantially water-insoluble organic liquid with an interfacial polycarbonate formation catalyst, water and an alkali metal or alkaline earth metal base, the aqueous phase of the reaction mixture thus obtained being buffered so as to maintain the pH thereof in the range of about 12–13.

The aromatic bischloroformate compositions utilized in the method of this invention comprise compounds having the formula

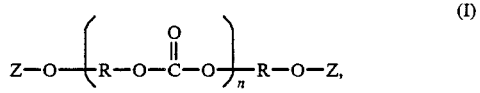

wherein R is a divalent aromatic radical; each Z is independently H or

at least one Z being

with the proviso that each Z is

in a major proportion of said compounds; and n is 0 or a positive number. They usually comprise principally bischloroformates (i.e., each Z is

)

having varying molecular weights. It is often desirable to maximize the proportion of bischloroformates in which is from 0 to about 6, at the expense of higher bischloroformates, monochloro-formates, free dihydroxyaromatic compounds and other by-products. It is also necessary that the bischloroformate composition be essentially phosgene-free; if phosgene is present, it will react with endcapping agent to form diaryl carbonate, whose presence is disadvantageous as noted hereinabove.

These bischloroformate compositions may be prepared by known methods (e.g., the method disclosed in the aforementioned U.S. Pat. No. 4,737,573, incorporated by reference herein) by the reaction of phosgene with dihydroxyaromatic compounds having the formula HO-R-OH. The R values may be aromatic hydrocarbon or substituted aromatic hydrocarbon radicals, with illustrative substituents being alkyl, cycloalkyl, alkenyl (e.g., crosslinkable-graftable moieties such as allyl), halo (especially fluoro, chloro and/or bromo), nitro and alkoxy.

The preferred R values have the formula $-A^1-Y-A^2-$, wherein each of $A^1$ and $A^2$ is a monocyclic divalent aromatic radical and Y is a bridging radical in which one or two atoms separate $A^1$ from $A^2$. The free valence bonds in formula III are usually in the meta or para positions of $A^1$ and $A^2$ is relation to Y.

The $A^1$ and $A^2$ values may be unsubstituted phenylene or substituted derivatives thereof wherein the substituents are as defined for R. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-2}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Arylsubstituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group. Most preferably, each of $A^1$ and $A^2$ is p-phenylene and Y is isopropylidene.

In step A of the method of this invention, the bischloroformate composition is partially capped by reaction with a monohydroxyaromatic compound or a salt thereof. Capping in this manner is disclosed, for example, in U.S. Pat. No. 4,743,676, also incorporated by reference herein. It may be achieved by reaction with such compounds as phenol, p-t-butylphenol, p-cumylphenol, octylphenol and nonylphenol, with phenol frequently being preferred. The reaction is most often conducted in a system also comprising water, a substantially inert, substantially water-insoluble inorganic liquid and an alkali or alkaline earth metal base. Illustrative bases are sodium hydroxide, potassium hydroxide and calcium hydroxide, with sodium hydroxide generally being preferred. Illustrative organic liquids are aliphatic hydrocarbons such as hexane and n-heptane; chlorinated aliphatic hydrocarbons such as methylene chloride, chloroform, dichloroethane, trichloroethane, tetrachloroethane, dichloropropane and 1,2-dichloroethylene; aromatic hydrocarbons such as toluene and xylene; substituted aromatic hydrocarbons such as chlorobenzene, o-dichlorobenzene, the chlorotoluenes, nitrobenzene and acetophenone; and carbon disulfide. The chlorinated aliphatic hydrocarbons, especially methylene chloride, are preferred.

The proportion of monohydroxyaromatic compound employed in the capping reaction is dependent on the desired molecular weight of the polycarbonate finally formed, in accordance with the following equation:

$$P = \frac{200U}{M},$$

wherein P is the mole percent of endcapping agent based on structural units in the bischloroformate composition, U is the molecular weight of said structural units and M is the number average molecular weight of polycarbonate desired. This proportion is then adjusted according to the approximate value of the molecular weight distribution of the polycarbonate, the weight average molecular weight being the product of number average molecular weight and molecular weight distribution. For the most part, the desired weight average molecular weight for the purposes of this invention is in the range of about 19,000–23,000, and the molecular weight distributions obtained according to the invention are on the order of 2.3–2.5. In general, suitable proportions of monohydroxyaromatic compound for use to prepare a bisphenol A polycarbonate of the desired molecular weight are in the range of about 3–6 mole percent, based on structural units in the bischloroformate composition.

In step B, the partially capped bischloroformate composition is polymerized to a polycarbonate under specific conditions. One of these conditions is its presence as a solution in an organic liquid as previously described; it is generally preferred to employ the already prepared solution of the partially capped bischloroformate without removal and replacement of solvent, although a new solvent may be supplied if desired. Solutions with a concentration of about 1.0–1.5 $\underline{M}$ in carbonate structural units are acceptable.

Also employed is an interfacial polycarbonate formation catalyst. Suitable catalysts are disclosed in the aforementioned U.S. Pat. Nos. 4,737,573 and 4,743,676, and include tertiary amines, quaternary ammonium and phosphonium salts and amidines of the type known in the art to be effective in the reaction of phosgene with bisphenols. Illustrative amines are triethylamine, tri-n-propylamine, diethyl-n-propylamine, tri-n-butylamine and 2-dimethylaminopyridine, with triethylamine being preferred.

An essential feature of the invention is the employment in step B of water and an alkali metal or alkaline earth metal base which will buffer the reaction mixture in a pH range of about 12-13. Suitable bases include mixtures of alkali metal hydroxides and alkali metal carbonates, such as sodium hydroxide-sodium carbonate mixtures. The preferred bases, however, are alkaline earth metal hydroxides including magnesium hydroxide, calcium hydroxide and barium hydroxide. Calcium hydroxide is especially preferred since its limited solubility in water provides a pH of about 12.3, precisely the optimum level for formation of a polycarbonate having the desired molecular weight characteristics.

In all respects other than the maintenance of pH in the above-identified range during polycarbonate formation, the procedure for step B of the method of this invention is identical to that previously employed for the conversion of bischloroformate compositions to polycarbonates. Thus, temperatures are usually in the range of about 0°–100° C. and preferably about 25°–50° C., and the proportion of catalyst is usually within the range of about 0.025–3.0 and preferably about 0.25–0.50 mole percent, based on structural units in the bischloroformate composition. Also present in the reaction mixture may be at least one bisphenol or salt thereof, such as bisphenol A disodium salt. Either batch or continuous conditions may be employed for step B.

The method of this invention is illustrated by the following examples.

EXAMPLES 1–4

In each example, a 500-ml. Morton flask equipped with a stirring paddle and condenser was charged with 100 ml. of a 1.06 $\underline{M}$ solution of bisphenol A bischloroformate oligomers, 150 ml. of deionized water, 2 grams of sodium bicarbonate, 2 ml. of 50% aqueous sodium hydroxide solution and 452.7 mg. (4.5 mole percent based on bisphenol units) of phenol. The mixture was allowed to equilibrate for 15 minutes at a pH in the range of 8.5–9.5. At the end of that time, analysis of the organic phase by gel permeation chromatography showed that no phenol remained, and that said solution comprised principally bisphenol A bischloroformate and monochloroformate oligomers having degrees of polymerization (DP) from 1 to about 9.

To the mixtures were added 10 ml. of triethylamine solutions of various concentrations in methylene chloride and 15 grams of solid calcium hydroxide, to afford a pH of the aqueous phase of about 12.3. The mixtures were agitated for 15 minutes and the organic phases were removed and washed twice with aqueous hydrochloric acid solution and three times with deionized water.

Samples of the organic phases were analyzed by gel permeation chromatography to determine molecular weight and molecular weight distribution. Other samples were treated with acetone to precipitate high molecular weight polycarbonate, whereupon low molecular weight oligomers remained in solution; the solutions were filtered, evaporated to dryness and analyzed by high pressure liquid chromatography to determine the proportion of said oligomers. The results are given in the following table.

|  | Example | | | |
|---|---|---|---|---|
|  | 1 | 2 | 3 | 4 |
| Mole % triethylamine* | 0.17 | 0.25 | 0.50 | 1.0 |
| % oligomers (DP 9 or less) | 0.32 | 0.26 | 0.29 | 1.36 |
| Mw | 20,600 | 19,200 | 20,200 | 20,500 |
| Mw/Mn | 2.34 | 2.38 | 2.31 | 2.41 |

*Based on bisphenol units.

None of the products were found to contain free phenol, free bisphenol A or diphenyl carbonate. By contrast, a sample of a commercial bisphenol A polycarbonate produced by the conventional phosgene process contained 4.89% low molecular weight oligomers and 1182 ppm. of diphenyl carbonate. It had a weight average molecular weight of 27,300 and a molecular weight distribution of 2.61. Thus, it is apparent that despite the higher weight average molecular weight, the commercial product contained substantially more low molecular weight oligomers than the products obtained by the method of this invention.

What is claimed is:

1. A method for converting an aromatic bischloroformate composition to aromatic polycarbonate having a predetermined weight average molecular weight which comprises the steps of:
   (A) partially capping said bischloroformate composition by reaction with a monohydroxyaromatic compound or salt thereof in an amount to provide the desired molecular weight, and
   (B) contacting a solution of the partially capped bischloroformate composition in an inert, substantially water-insoluble organic liquid with an interfacial polycarbonate formation catalyst in the amount of about 0.025–0.50 mole percent based on structural units in said composition, water and an alkali metal or alkaline earth metal base, the aqueous phase of the reaction mixture thus obtained being buffered so as to maintain the pH thereof in the range of about 12–13.

2. A method according to claim 1 wherein the aqueous phase of the reaction mixture in step B is buffered by employing calcium hydroxide as the base.

3. A method according to claim 2 wherein the organic liquid is methylene chloride.

4. A method according to claim 3 wherein the catalyst is triethylamine.

5. A method according to claim 4 wherein the bischloroformate composition comprises compounds having the formula

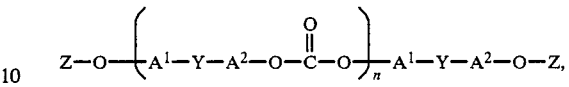

wherein each of $A^1$ and $A^2$ is a monocyclic divalent aromatic radical; Y is a bridging radical in which one or two atoms separate $A^1$ from $A^2$; each Z is independently H or

at least one Z being

with the proviso that each Z is

in a major proportion of said compounds; and n is 0 or a positive number.

6. A method according to claim 5 wherein the monohydroxyaromatic compound is phenol.

7. A method according to claim 6 wherein the proportion of phenol employed in step A is in the range of about 3–6 mole percent, based on structural units in the bischloroformate composition.

8. A method according to claim 7 wherein n is from 1 to about 9.

9. A method according to claim 8 wherein the bischloroformate solution employed in step B has a concentration of about 1.0–1.5 $\underline{M}$ in carbonate structural units.

10. A method according to claim 9 wherein each of $A^1$ and $A^2$ is p-phenylene and Y is isopropylidene.

11. A method for preparing a bisphenol A polycarbonate having a weight average molecular weight in the range of about 19,000–23,000 and a molecular weight distribution in the range of about 2.3–2.5, which comprises the steps of:
   (A) partially capping a composition comprising bisphenol A bischloroformate oligomers having degrees of polymerization from 1 to about 9 by reaction with phenol in the amount of about 3–6 mole percent, based on structural units in said composition; and
   (B) contacting a methylene chloride solution of the product of step A with triethylamine, water and solid calcium hydroxide at a temperature in the range of about 25°–50° C. and a pH of the aqueous phase in the range of about 12–13 to produce said polycarbonate; the proportion of triethylamine being in the range of about 0.25–0.50 mole percent, based on structural units in said composition.

* * * * *